Jan. 9, 1923.
P. L. SANDOR.
SOLDERING IRON.
FILED SEPT. 10, 1921.
1,441,537
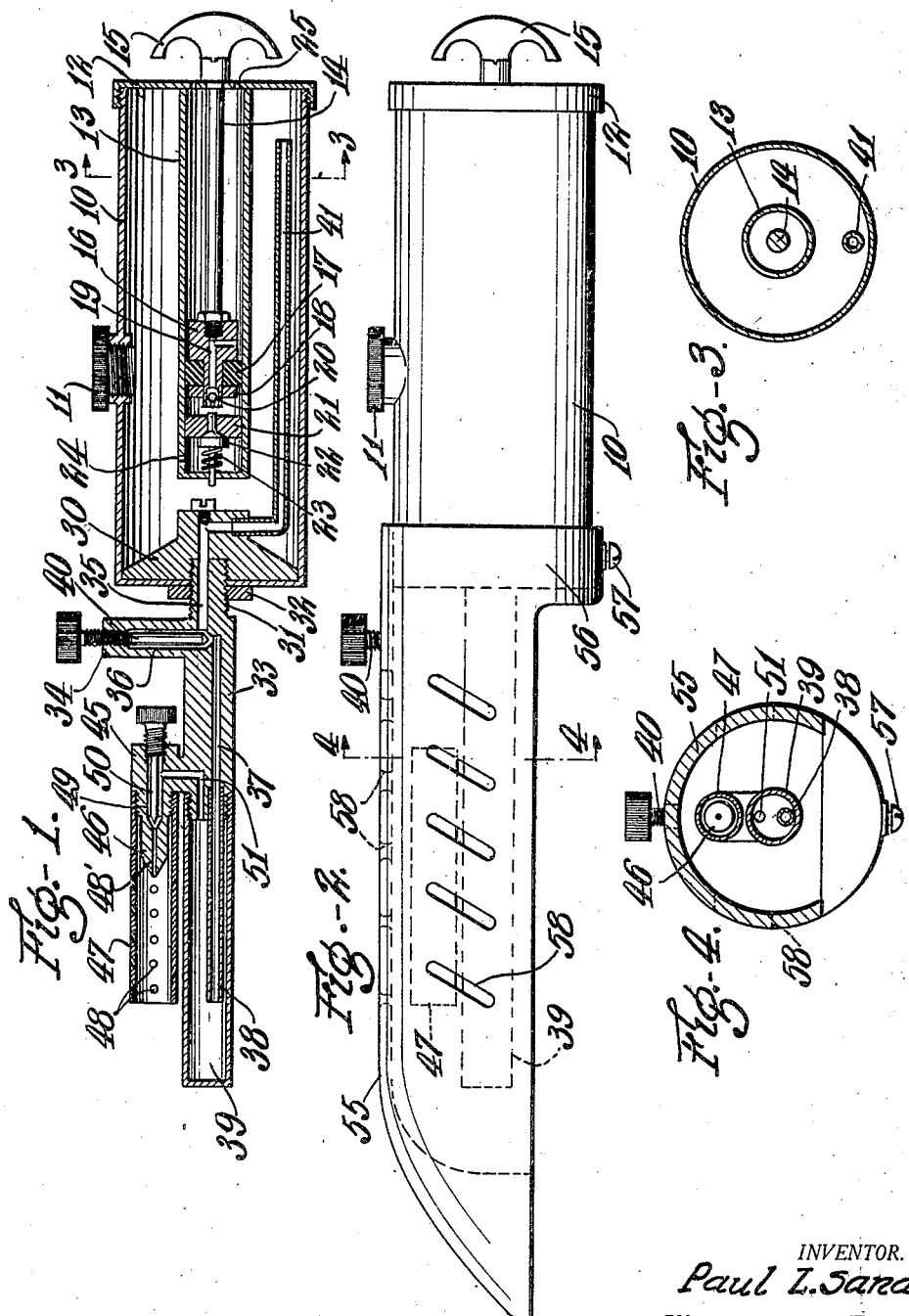
INVENTOR.
Paul L. Sandor
BY
ATTORNEY.

Patented Jan. 9, 1923.

1,441,537

UNITED STATES PATENT OFFICE.

PAUL L. SANDOR, OF THERESA, SASKATCHEWAN, CANADA.

SOLDERING IRON.

Application filed September 10, 1921. Serial No. 499,597.

*To all whom it may concern:*

Be it known that I, PAUL L. SANDOR, a citizen of Canada, residing at Theresa, in the Province of Saskatchewan, Canada, have invented certain new and useful Improvements in Soldering Irons, of which the following is a specification.

This invention relates to soldering irons, having more particular reference to a soldering iron in which the bolt and its heater are comprised in a single self-contained implement.

The invention has for an object to provide a soldering iron of this type of simple construction and in which the heating means will act efficiently to heat the bolt.

For further comprehension of the invention, and of the objects and advantages thereof, reference will be had to the following description and appended claims, and to the accompanying drawings in which the various novel features of the invention are more particularly set forth.

Fig. 1 of the drawings is an axial sectional view of the heating element of a soldering iron constructed according to the invention, the bolt being omitted.

Fig. 2 is a side elevation of the complete iron.

Fig. 3 is a transverse section on the line 3—3 of Fig. 1.

Fig. 4 is a transverse section on the line 4—4 of Fig. 2.

In constructing my improved soldering iron I provide a cylindrical tank 10 which is adapted to contain a suitable fuel liquid such as gasoline or other oil, being provided on one side with a filling opening closed by a screw cap 11, and having one head in the form of a removable cap 12. Fixed to this cap 12, and projecting therefrom axially into the tank 10, is a cylinder 13 utilized for pumping air into the tank.

Within this cylinder 13 is a piston having a one-way valve, this piston being fixed to a rod 14 extending through the cap 12 and having a handle 15 on its outer end. The piston comprises a body 16 of less diameter than the inside of the cylinder 13 and having a diminished extension on which is placed a packing ring 17 held in place by a nut or washer 18. Extending through the piston body is a passage 19 enlarged at one end to form a valve chamber containing a ball valve 20 acting in a well known manner to prevent flow of air through the passage 19, back toward the handle 15.

Extending across the cylinder 13 adjacent its inner end is a partition 21 forming a seat for a valve 22 which is pressed to closed position by a spring 23 and acts to prevent back flow of air in the cylinder. Formed in the inner and outer ends of the cylinder are air holes 24 and 25 respectively through which the air is drawn into the cylinder and discharged into the tank 10.

Formed in the end of tank 10 opposite to the cap 12 is a circular block 30 into which is screwed the nipple 31 of a burner element, a lock nut 32 holding said nipple against displacement. The burner element comprises a cylindrical body 33 from one end of which the nipple projects, a hollow transverse boss 34 being formed on the body 32 at this end. Extending through the block 30 and nipple 31 is a passage 35 leading into the chamber 36 formed in the boss 34, while a second passage 37 offset laterally from the passage 35 leads forwardly through the burner body 33, a tube 38 being fitted into the outer end of the passage 37, this tube 38 extending into an elongated cap 39 screwed on the end of the burner body and providing a compartment in the burner element in which the fuel is heated. Threaded into the boss 34 is a needle valve 40 which controls the flow of liquid between the passages 35 and 37. Connected to the inner end of passage 35 is a tube 41 which extends rearwardly in the tank 10.

Formed on the forward end of the member 32 is an offset 45 provided with a burner tip 46, this tip being enclosed by a sleeve 47 screwed on to the offset and having a series of air intake passages 48 in its side walls. Extending through the burner tip 46 is a small passage 48 communicating at its rear end with a larger passage 49 forming a chamber for a needle valve 50 screwed into the rear end of the offset 45. An angular passage 51 leads through the member 33 from the interior of the cap 39 to the valve chamber 49.

The burner member just described is adapted to be enclosed by the bolt which is in the form of an elongated shell 55 presenting at one end a collar 56 which fits over the end of the tank 10 and may be secured thereto by a set screw 57. The body of the shell is of segmental cross section, being thus open on the underside in registry with the burner element, while the front of the shell is made solid and of tapering form as shown. Formed in the sides of the shell 55, and spaced both longitudinally and transversely thereof, are air openings 58.

It is believed that the manner of operation and use of my improved soldering iron will be readily understood from the above description, the fuel liquid being placed in tank and air pumped thereinto by reciprocating the piston in cylinder, the air passing through the piston on its rearward stroke and being forced into the tank on the forward stroke of the piston. The liquid from the tank first passes into the chamber formed by cap 39 where it is heated by the heat of the flame issuing from the tip 46, passing finally through passage 51 to the burner tip. When the burner is first started the cap is initially heated by any suitable means.

Having thus described my invention what I claim as new and desire to protect by Letters Patent of the United States is as follows:—

1. In a soldering iron, a cylindrical fuel tank, a bolt in the form of a shell of segmental cross section presenting a collar at one end fitting over and secured to the end of the tank connected to said tank, a burner body connected at its rear end to said tank and extending within said hollow bolt longitudinally thereof and presenting at its forward end an enclosed chamber, a valve controlled conduit leading from said tank through said burner body to said chamber, a burner tip on said body extending parallel to and adjacent said chamber and offset axially therefrom away from the open side of said bolt, a conduit leading from said chamber through said burner tip, and a needle valve controlling said conduit.

2. In a soldering iron, a cylindrical fuel tank, a bolt in the form of a shell of segmental cross section presenting a collar at one end fitting over and secured to the end of the tank connected to said tank, a burner body connected at its rear end to said tank and extending within said hollow bolt longitudinally thereof and presenting at its forward end an enclosed chamber, a valve controlled conduit leading from said tank through said burner body to said chamber, a burner tip on said body extending parallel to and adjacent said chamber and offset axially therefrom away from the open side of said bolt, a conduit leading from said chamber through said burner tip, and a needle valve controlling said conduit, and a perforated sleeve surrounding and projecting forwardly from said burner tip parallel to the said chamber the wall of said bolt having perforations formed therein.

In testimony whereof I have affixed my signature.

PAUL L. SANDOR.